United States Patent [19]

Schlüter et al.

[11] Patent Number: 5,079,461
[45] Date of Patent: Jan. 7, 1992

[54] POWER SUPPLY DEVICE FOR BICYCLES

[76] Inventors: Gerd Schlüter, Joachimstaler Weg 13, 2300 Kiel 14; Hans-Jürgen Lipski, Bahrenfelder Markplatz 4, 2000 Hamburg 50; Georg Schröder, Achter Höf 16, 2211 Oldendorf, all of Fed. Rep. of Germany

[21] Appl. No.: 531,392

[22] Filed: Jun. 1, 1990

[30] Foreign Application Priority Data

Jun. 3, 1989 [DE] Fed. Rep. of Germany ....... 3918166

[51] Int. Cl.$^5$ ............................................. H02K 7/02
[52] U.S. Cl. .............................. 310/67 A; 310/67 R; 310/268; 310/68 D
[58] Field of Search ............... 310/67 A, 67 R, 156, 310/268, 68 R, 68 D, 152, 156

[56] References Cited

U.S. PATENT DOCUMENTS

| | | | |
|---|---|---|---|
| 3,604,965 | 3/1970 | Stroud | 310/67 R |
| 3,806,744 | 4/1974 | Abraham et al. | 310/67 R |
| 4,228,384 | 5/1978 | Arnold et al. | 310/268 |

FOREIGN PATENT DOCUMENTS

| | | | |
|---|---|---|---|
| 0133571 | 2/1985 | European Pat. Off. | 310/67 R |
| 516221 | 12/1930 | Fed. Rep. of Germany | 310/67 R |
| 1826690 | 7/1961 | Fed. Rep. of Germany | 310/67 R |
| 3126150 | 1/1983 | Fed. Rep. of Germany | 310/67 R |
| 856493 | 6/1940 | France | 310/67 R |
| 2606951 | 5/1988 | France | 310/67 R |
| 1132949 | 11/1968 | United Kingdom | 310/67 R |

Primary Examiner—R. Skudy
Assistant Examiner—Matthew Nguyen
Attorney, Agent, or Firm—Walter C. Farley

[57] ABSTRACT

A power supply device for bicycles is specified, in which a disk-shaped armature (44) is arranged in a fixed manner between permanent magnets (47, 48) rotating with the hub of a wheel. The armature is constructed as copper-coated insulating armature having conductor tracks in rotary current technology. Neither carbon brushes nor other wearing parts are present, so that a closed housing can be used (FIG. 1).

9 Claims, 3 Drawing Sheets

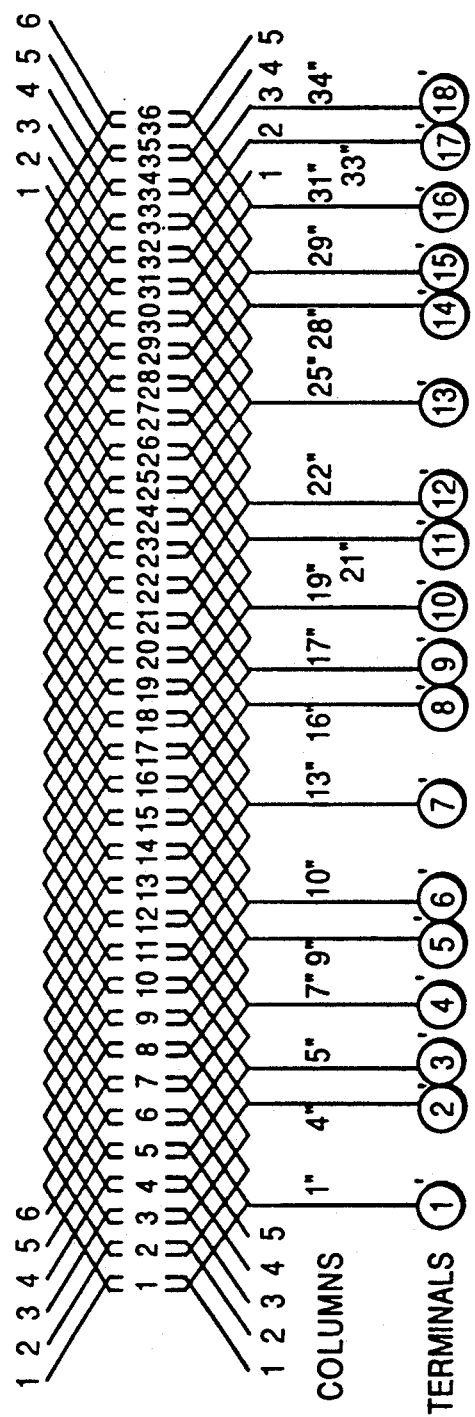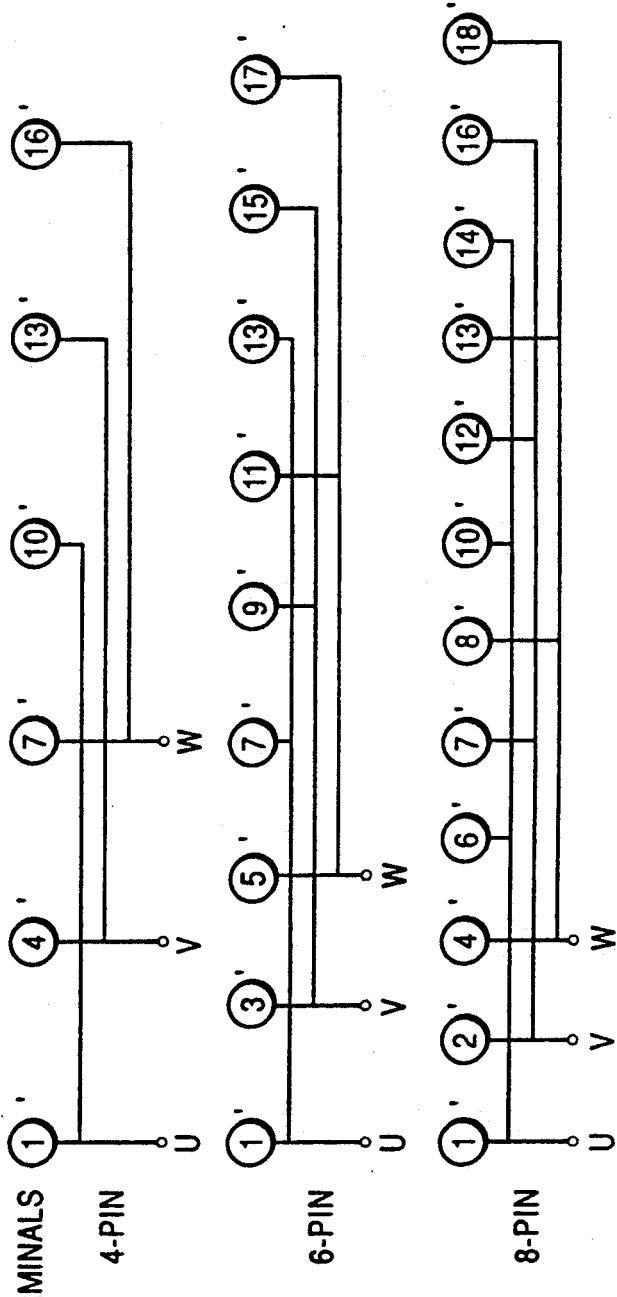
FIG. 2a  FIG. 2b  FIG. 2c  FIG. 2d

POWER SUPPLY DEVICE FOR BICYCLES

The invention relates to a power supply device for bicycles.

Usually, bicycle dynamos are constructed as alternating current generators which have a coil which is arranged in a fixed manner, a magnetic field being induced in said coil by rotating magnets. These dynamos have, in particular if, they are provided with a friction roller, very bad efficiency. This requires increased performance from the cyclist.

DE PS 37 03 523 discloses a power supply device for bicycles or the like having a generator which has a disk-shaped rotor and a plurality of permanent magnets magnetized in the axis direction of the rotor, said permanent magnets being arranged with alternating polarality in a non-magnetic disk. The rotor is in this case constructed as copper-coated insulating support plate, from which the generated generator voltage can be tapped via contact brushes. The terminals lead to a storage battery which can be connected in parallel and to which one or more connectable consumers are connected.

The disadvantage of this power supply device lies in particular in the fact that collector brushes are provided which can lead in constant operation to wear and a later failure.

An electric device known from DE GM 1 826 690 having excitation by means of permanent magnets does not refer to a power supply device for bicycles. This device, insofar as it is a generator having an armature arranged on the fixed shaft, is rather a design which generates power between 100 and 500 W at frequencies between 400-2000 Hz. A car light device is explicitly specified magnets are either held in protective tubes or bonded onto the walls of gray cast iron end shields. The particular problems with bicycles, namely the provision of sufficient voltage at very low rotation speeds as well as the avoidance of losses are not addressed in this publication.

The invention is based on the object of specifying a power supply device for bicycles which does not require any contact brushes, provides a sufficient voltage even at low rotation speeds, the losses of which are low and which is of simple construction.

The device according to the invention can be constructed with the simplest means. Due to the rigid mounting of the armature on the shaft, the terminals of the conductor tracks can be led outwards in a simple manner through a bore in the shaft. The housing of the generator can be mounted on both sides of the shaft and thus hermetically sealed. Since no wear can occur in the generator it is not necessary to provide for possible disassembly of the generator.

The conductor tracks can be applied to the rotor on one side or on both sides. The magnets bringing about the magnetization can be arranged in disk-shaped retainers on one or both sides of the armature, the retainers preferably being received in grooves of the outer circumference of the housing. The additional retainers can also be dispensed with if the magnets are mounted directly in the lateral outer walls of the housing.

Instead of using a single armature on the shaft, a plurality of armatures arranged staggered one behind the other can also be used, the generated voltages being added together with corresponding wiring of the terminals. Additional rotating magnets can also be provided between individual armature disks, said magnets being fixed in retainers which are in turn held on the outer circumference of the housing of the generator.

The invention is particularly suitable for the power supply of bicycles.

The combination permits a particular design of a bicycle generator which nevertheless provides a high voltage at a very low rotation speed, and the losses of which, in particular also in DC operation, are very low.

The invention is explained in greater detail below with reference to an exemplary embodiment, in which:

FIG. 2a shows a view of the conductor track characteristic of one pass in a developed view, FIGS. 2b–d show terminal schemes for a different number of poles.

Figure 1:
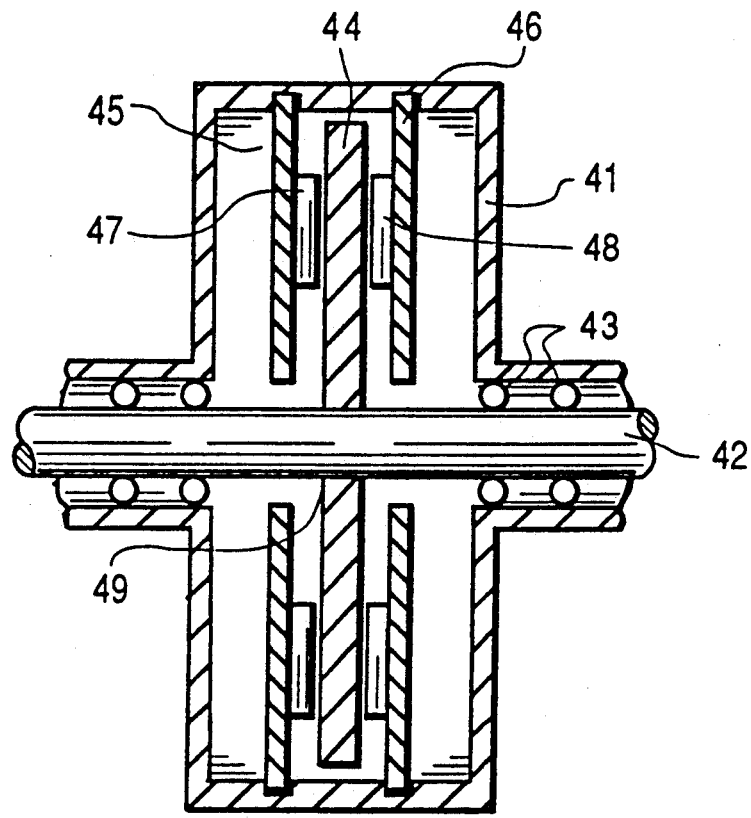
FIG. 1 shows a cross-section of the invention.

FIG. 1 shows an exemplary embodiment of the invention in cross-section. A shaft 42 is provided which is the wheel shaft of a bicycle. This shaft is arranged in a fixed manner. The housing 41 is rotatably mounted on the fixed shaft 42 via bearings 43. The housing is connected to the spokes or the rim of the wheel. Within the housing 41, two annular retainers 45 and 46 lying in planes perpendicular to the shaft 42 are provided which are received on the inner circumference in grooves of the housing 41. The retainers 45 and 46 terminate on their inner side shortly in front of the shaft 42, so that, together with the housing 41 they are rotatable in relation to the shaft 42.

The retainers 45 and 46 receive the magnets 47 and 48 which are aligned with alternating polarity in relation to one another. The armature disk 44 is located between the magnets 47 and 48 which also rotate, said armature disk being rigidly connected to the shaft 42 at the point 49. The back iron of the magnets 47 and 48 can occur via the retainers 45 and 46 and a part of the housing 41.

Figure 4:
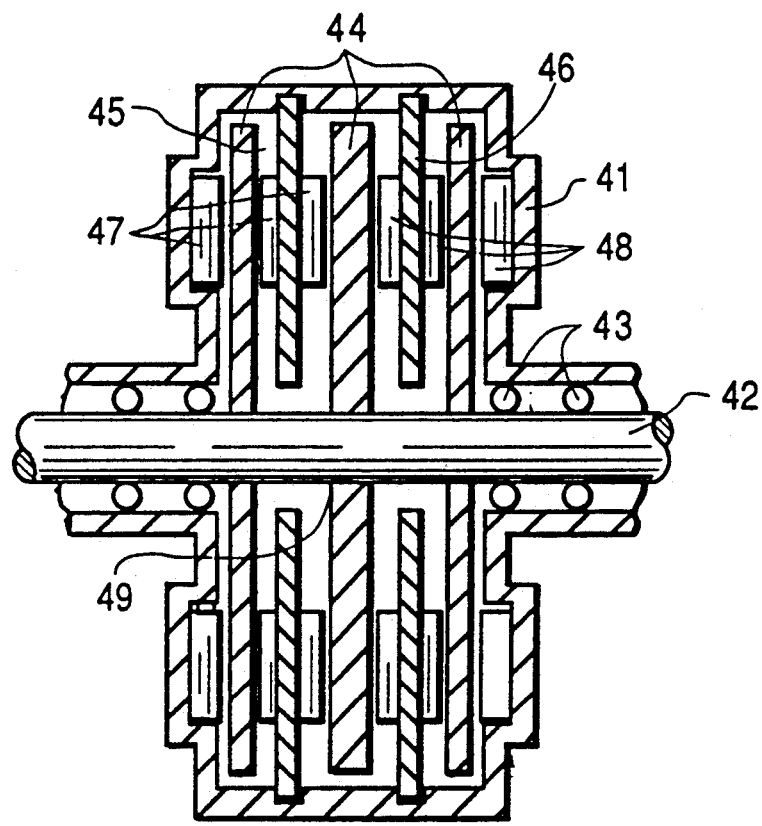
FIG. 4 shows a side elevation, in section, of a further embodiment of a generator in accordance with the invention.

Instead of the two additional retainers 45 and 46, the magnets 47 and 48 can also be mounted directly onto the lateral walls of the housing 41, in recesses as shown in FIG. 4 or for example via retainers, bolts or by bonding. As a result, the disks 45 and 46 can be dispensed with and a very narrow design of the generator can be achieved. The magnets can also be constructed of magnetic molding material (manufacturer's designation VESTAMID), which can be matched to the internal shape of the hub.

Figure 3:
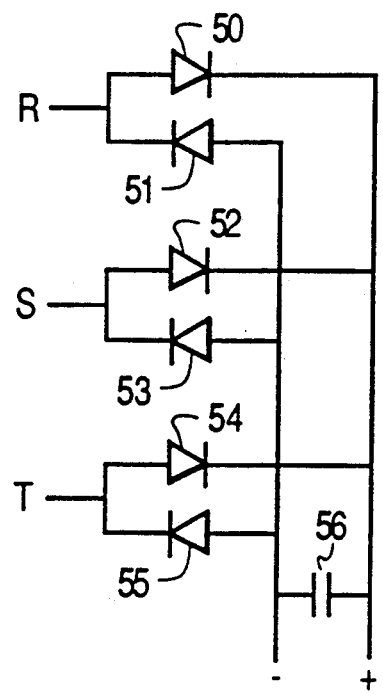
FIG. 3 shows a rectifier circuit.

According to the invention, the conductor tracks on the armature 44 are realized as rotary current winding. The design of a corresponding winding which permits a multi-pin wiring of the individual conductor tracks is shown in FIG. 2a. In total, 36 columns are provided which in each case load to terminals. By selecting certain terminals, for example a four-pin conductor track routing corresponding to FIG. 2b, a six-pin corresponding to FIG. 2c or an eight-pin corresponding to FIG. 2d can be achieved. The terminals U, V, W connected together are connected to a rectifier circuit corresponding to FIG. 3, which can be either star-shaped or delta-shaped. In the star-shaped arrangement, the diodes 50–56 are provided which are preferably constructed in germanium technology in order to achieve low on-state voltages. In order to smooth the resulting rotary current, a capacitor 56 can be provided.

Preferably, a voltage doubling circuit can also be used. As shown in FIG. 4, a plurality of armature disks can be mounted on the fixed shaft with sets of magnets between the armature disks.

| List of reference symbols | |
|---|---|
| 1–6 | connections |
| 1'–18' | terminals |
| 1"–34" | coils |
| 41 | housing |
| 42 | shaft |
| 43 | bearing |
| 44 | armature |
| 45 | retainer |
| 46 | retainer |
| 47 | magnet |
| 48 | magnet |
| 49 | connection |
| 50–55 | diodes |
| 56 | capacitor |

We claim:

1. An electrical power generator for use on a bicycle comprising;
   a fixed shaft having a bore therein;
   a disk-shaped armature mounted on said fixed shaft, said armature comprising a copper-coated insulating support with conductor tracks arranged thereon as a multi-pin rotary current winding having end terminals;
   a rotatable, closed bicycle hub forming a housing for said generator;
   a plurality of permanent magnets supported on said rotatable housing, said permanent magnets being magnetized in an axial direction of said shaft and being circularly arranged with alternating polarity so that the flux from said magnets passes through said armature;
   a current rectifier circuit; and
   conductor means connecting said end terminals of said rotary current winding through said bore in said shaft to said rectifier circuit.

2. A device according to claim 1 wherein said rectifier circuit includes germanium diodes.

3. A device according to claim 1 wherein said hub includes means defining annular grooves in an inner surface thereof, said generator further comprising;
   annular retainers peripherally mounted in said grooves and carrying said permanent magnets.

4. A device according to claim 1 wherein said hub includes a plurality of recesses and said magnets are mounted directly in said recesses.

5. A device according to claim 1 wherein said armature comprises two oppositely axially facing surfaces, conductor tracks being formed on said two oppositely axially facing surfaces.

6. A device according to claim 5 wherein said armature includes a plurality of disk-shaped plates having conductor tracks thereon, said plates being mounted in axially spaced relationship along said fixed shaft.

7. A device according to claim 6 wherein a plurality of said magnets are mounted between each two disk-shaped plates forming part of said armature.

8. A device according to claim 1 wherein said armature includes a plurality of disk-shaped plates having conductor tracks thereon, said plates being mounted in axially spaced relationship along said fixed shaft.

9. A device according to claim 8 wherein said plurality of said magnets are mounted between each two disk-shaped plates forming part of said armature.

* * * * *